US006543943B1

(12) United States Patent
Sala

(10) Patent No.: US 6,543,943 B1
(45) Date of Patent: Apr. 8, 2003

(54) DEVICE FOR THE COLLECTION OF PHOTOGRAPHIC MATERIAL

(76) Inventor: Giampaolo Sala, Via Mestre, 3-33170 Pordenone (IT)

( * ) Notice: Subject to any disclaimer, the term of this patent is extended or adjusted under 35 U.S.C. 154(b) by 0 days.

(21) Appl. No.: 09/807,724

(22) PCT Filed: Oct. 14, 1999

(86) PCT No.: PCT/IB99/01686

§ 371 (c)(1), (2), (4) Date: Apr. 18, 2001

(87) PCT Pub. No.: WO00/25280

PCT Pub. Date: May 4, 2000

(30) Foreign Application Priority Data

Oct. 22, 1998 (IT) ........................................ UD98A0183

(51) Int. Cl.[7] ........................ G03B 13/00; G03B 27/52; G07F 17/12; G07F 7/00

(52) U.S. Cl. .......................... 396/564; 396/570; 355/40

(58) Field of Search ................................ 396/564, 570, 396/578, 429; 355/40, 27; 235/379, 381

(56) References Cited

U.S. PATENT DOCUMENTS 3,778,596 A * 12/1973 Wapner ..................... 109/24.1
3,973,237 A * 8/1976 Sawaguchi et al. ......... 194/210
4,823,162 A * 4/1989 Renn et al. ................. 101/111
5,473,402 A * 12/1995 Long et al. .................... 355/40
5,652,936 A * 7/1997 Klees et al. ................ 396/564
5,667,288 A * 9/1997 Kang .......................... 232/44
5,831,714 A * 11/1998 Yoshikawa ................... 355/40
6,206,585 B1 * 3/2001 Walter ........................ 345/961
6,233,399 B1 * 5/2001 Walter ........................... 396/2

FOREIGN PATENT DOCUMENTS

| | | | |
|---|---|---|---|
| EP | 0234833 A2 | * | 9/1987 |
| EP | 0818759 A2 | * | 1/1998 |
| FR | 2670929 A1 | * | 6/1992 |
| GB | 2269469 | * | 2/1994 |
| WO | WO 89/08901 | * | 9/1989 |
| WO | WO 97/48017 | * | 12/1997 |

* cited by examiner

*Primary Examiner*—Alan A. Mathews
(74) *Attorney, Agent, or Firm*—Antonelli, Terry, Stout, & Kraus, LLP

(57) ABSTRACT

Device for the self-service collection of photographic material, such as rolls of film, throwaway cameras, negatives for reprinting or otherwise, to be subjected to processing, said photographic material being placed by users in envelopes (13), or in other similar containing means, solidly bearing an identification code and equipped with a corresponding ticket or receipt which can be detached and kept by the customer to collect the processed photographic material, the envelopes (13) being first compiled by the users with their own identification data and with data regarding the processing required and then introduced into collection means (19), such as a sack, a box or similar, equipped with introduction slits (18), said device comprising detection means (26, 27) located upstream of said collection means (19) and suitable to verify at least the validity of said identification code, said detection means (26, 27) governing closing means (20) which can be selectively activated and suitable to prevent the passage of said envelopes (13) to the collection means (19) in the event that said detection means (26, 27) do not give consent for the envelopes (13) to be unloaded.

9 Claims, 2 Drawing Sheets

DEVICE FOR THE COLLECTION OF PHOTOGRAPHIC MATERIAL

FIELD OF THE INVENTION

The invention concerns a device for the collection of photographic material.

The device according to the invention is suitable to be used in centralized collection points for photographic material of the self-service type in order to allow a more rational and at least partly automated management of said photographic material and to prevent users from defrauding the collection points.

BACKGROUND OF THE INVENTION

The state of the art includes commercial outlets, such as department stores or similar, in which there is a self-service system to collect photographic material.

Said photographic material, for example rolls of film, throwaway cameras, negatives to be reprinted and suchlike, is placed by the customer in appropriate envelopes on which the identification of the customer, and the information concerning the processing required, are written manually.

This self-service system uses collection and distribution points which usually comprise a work plane used by the customers to fill in the empty envelopes, and one or more containers, equipped with introduction slits, into which the customers introduce the completed envelopes filled with the photographic material.

These containers, or simply the envelopes contained therein, are taken in at the end of the day, or periodically, by the workers from the photographic processing laboratories in which the processing requested is carried out. When it is ready, the photographic material is re-delivered to the shop it came from to be distributed to the customers.

Every envelope is equipped with a detachable ticket which the customer keeps and uses as a receipt to collect the processed photographic material.

The same identification code is written on the ticket and on the envelope, thus achieving a univocal correspondence between the tickets and envelopes delivered which facilitates and speeds up the subsequent delivery operations.

The delivery may be assisted by a worker who, having received the ticket with the identification code, looks for and delivers the corresponding envelope to the customer; it may also be carried out by automatic distributors suitable to read and recognize the tickets, or other identification means, for example a card issued to the customer.

The most sophisticated self-service collection points use electronic interface means, usually consisting of a processor, a monitor, a key board and a printer.

In this type of collection points it is possible to know in real time the number of envelopes collected and those being processed, and also to do statistics.

In computerized collection points, instead of writing the identification data and the type of processing required manually on the envelope, the customers input the information required through the key board.

The data keyed in by the customers is then printed automatically on an adhesive label to be applied to the envelope, or directly printed on the envelope.

At present, however, both in manually managed and computerized collection points, there is no efficient control able to verify that the customers, after having filled in the envelope, insert the photographic material in the envelope and introduce it into the collection containers provided for this purpose.

Consequently, the collection devices such as have been used until now can easily be defrauded by the customers.

In fact, businessmen working in this field often complain of cases of clients who follow the procedure of compiling the envelope, keep the relative ticket, and then do not introduce the envelope into the container, or introduce the envelope without the photographic material, and then go to the collection point to ask for damages for the loss or non-delivery of the photographic material.

Document U.S. Pat. No. 3,778,596 describes a device for the automatic collection of envelopes containing material to be deposited in banking institutions. The device has the disadvantage that it does not include means suitable to recognize whether or not the envelope contains objects; this gives the opportunity for dishonest clients to compile the deposit slip on the envelope with data which do not correspond to the content of the envelope, and to insert an empty envelope into the collection device.

Another disadvantage of the device is that it can only receive substantially flat, paper objects, due to the configuration of the reception tray which has to be able to slide below a shield which prevents the client's hands from passing. Therefore, this device cannot be adapted for the collection of photographic material such as rolls of film or throwaway cameras.

WO-A-89 08901 describes a vending machine for automatic collection for processing of photographic film, which involves manual comparison by an operator emptying the machine of the number of envelopes collected and the number of receipt tickets issued. This is not an automatic procedure and does not necessarily detects fraud involving the insertion of empty envelopes.

The present Applicant has devised and embodied this invention to overcome this shortcoming and to obtain other advantages as explained hereafter.

SUMMARY OF THE INVENTION

A first purpose of the invention is to prevent users from defrauding the self-service collection points for photographic material.

A second purpose of the invention is to simplify and make more rational the operations to collect and distribute the photographic material, allowing an at least partly automated management of the latter operations.

A third purpose of the invention is to reduce to a minimum the manual operations of the worker, and the probability of mistakes made thereby, and also to allow the data concerning the photographic material collected to be continuously monitored.

The device according to the invention comprises at least a containing means, such as a sack, a box or similar, inside which the envelopes containing the photographic material can enter only if they have pre-determined requisites.

Said requisites, which may be established on different occasions, may comprise: verifying the identification code of the envelope and/or that the data compiled by the customer is correct, determining the weight of the envelope, verifying the presence of the photographic material and suchlike.

The device according to the invention, therefore, prevents users from carrying out any illicit actions to the detriment of the collection points and particularly from pretending to introduce the envelopes into the containing means or from introducing empty envelopes.

According to the invention, the device comprises detection means located upstream of the collection zone and functionally associated with closing means suitable to allow or prevent the passage of the envelopes into said collection zone.

According to one characteristic of the invention, the detection means are suitable to verify that the envelopes introduced by the users respect pre-determined and defined requisites.

According to another characteristic of the invention, the collection device can be functionally associated with an electronic processing unit in order to allow an automated management of the photographic material collected.

BRIEF DESCRIPTION OF THE DRAWINGS

These and other characteristics of the invention will become clear from the following description of a preferred form of embodiment, given as a non-restrictive example, with reference to the attached drawings wherein.

DETAILED DESCRIPTION OF PREFERRED EMBODIMENT

Figure 1:
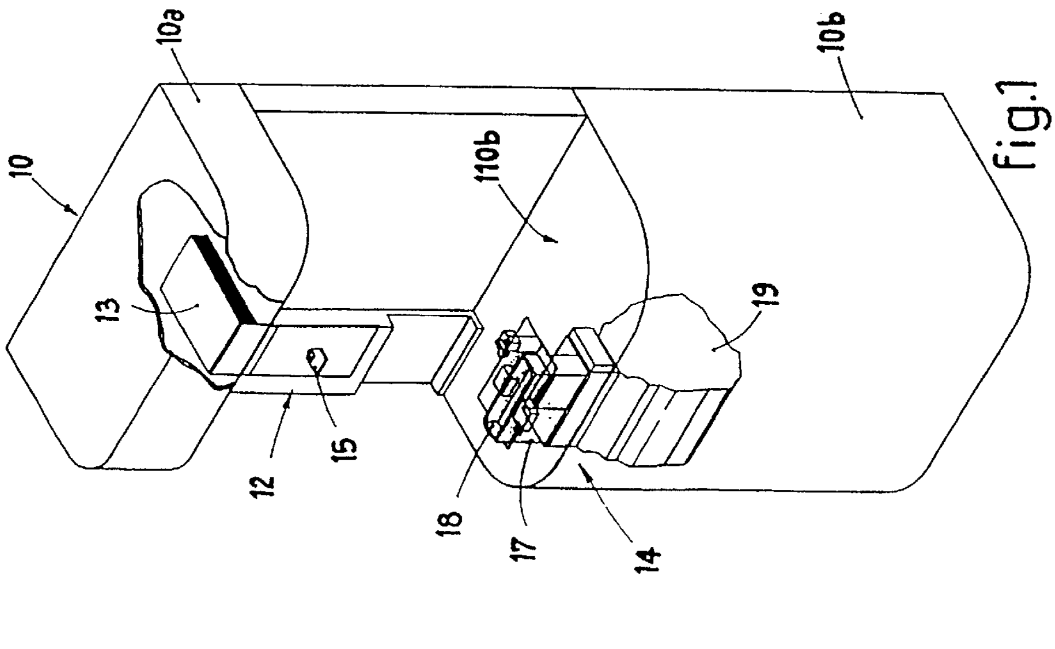
FIG. 1 shows a possible form of embodiment of a device according to the invention to collect photographic material.

FIG. 1 shows a possible form of embodiment of a device 10 according to the invention to collect photographic material.

Figure 2:
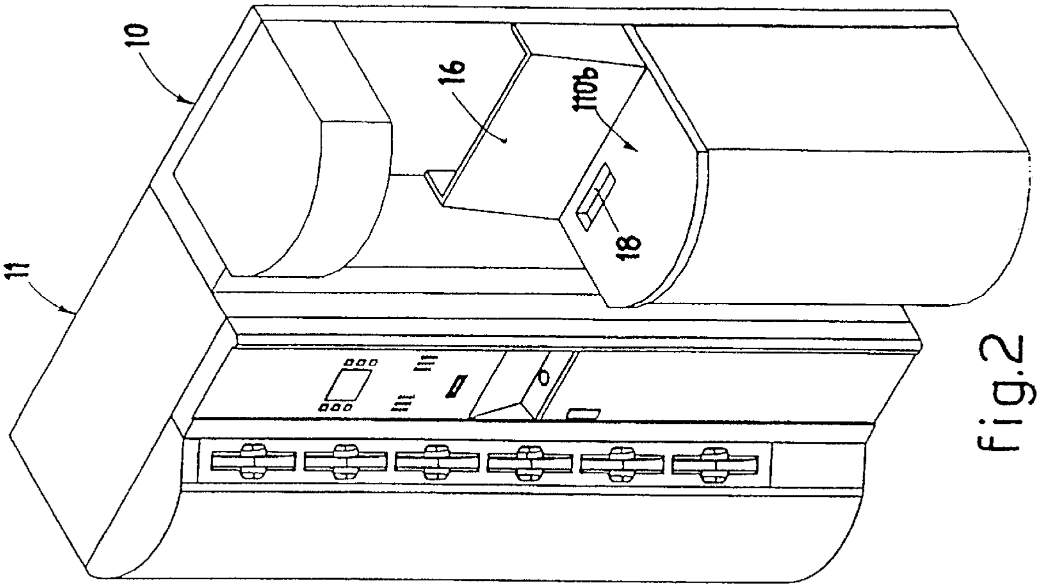
FIG. 2 shows a particular application of the device as in FIG. 1.

The device 10 may be used autonomously or in association with electronic interface means, or again, as shown in FIG. 2 and as will be described in more detail hereafter, in association with automatic distributors 11.

The device 10 according to the invention comprises, in its essential parts, a distribution unit 12 to distribute envelopes 13 to be filled and a unit 14 to collect the envelopes 13 which have been filled in by customers with their own identification data and with the data concerning the processing requested.

Before they are introduced into the collection unit 14, the envelopes 13 are filled with the photographic material, such as rolls of film, negatives to be reprinted, throw away cameras etc., to be sent to a photographic processing laboratory.

In the embodiment shown in FIG. 1, the distribution unit 12 is enclosed in an upper containing structure 10*a* and is equipped with a lever 15 which can be activated by the customer to command an automatic distribution mechanism suitable to distribute one envelope 13 at a time.

In the embodiment shown in FIG. 2, instead of the distribution unit 12, there is a collector 16 inside which the empty envelopes 13 are collocated.

The distribution unit 14 is enclosed and protected by a lower containing structure 10*b* which defines at the upper part a plane 110*b* which can be used by the customers as a surface on which to fill in the envelopes 13.

The collection unit 14 has a channel 17 to receive the envelopes 13, associated at the upper part with an introduction slit 18 made on the plane 110*b*, and at the lower part with a removable collection sack 19.

It is obvious that, instead of the sack 19, it is possible to use any removable container such as, for example, a box or similar.

Figure 3B:
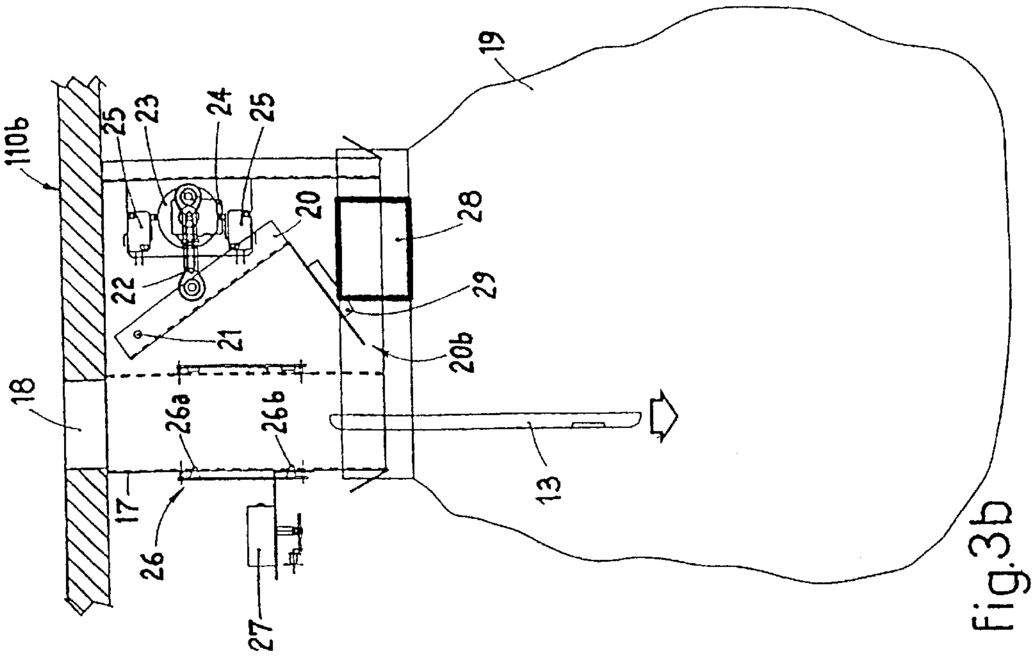
FIGS. 3*a*–3*b* show two different operating positions, partly in section, of the device as in FIG. 1.
Figure 3A:
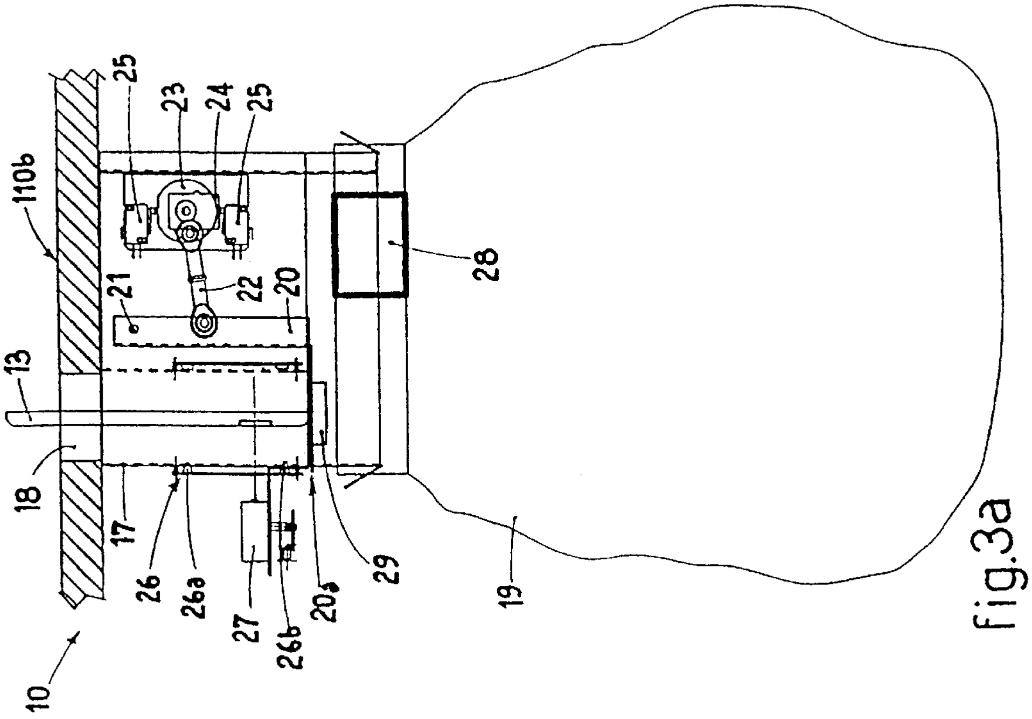

According to the invention, the reception channel 17 cooperates at the lower part with a door 20 suitable to selectively assume a closed position 20*a*, as shown in FIG. 3*a*, which prevents the passage of the envelope 13 into the sack 19, or an open position 20*b*, as shown in FIG. 3*b*, which allows the envelope 13 to fall into the sack 19.

In this case, the door 20 is substantially L-shaped and is suitable to oscillate around a pin 21 when activated by a rod 22 associated with a pulley 23 made to rotate by a motor 24.

The open position 20*b* and the closed position 20*a* of the door 20 are determined by two micro switches 25 suitable to be alternately switched on or, according to a variant, switched off, with every passage of a planar segment made on the circumference of the pulley 23.

According to one characteristic of the invention, the door 20 is commanded to open by a sensor unit 26 and a bar code reader 27. To be more exact, the sensor unit 26 detects the presence of the envelope 13 introduced by the user into the channel 17 and activates the bar code reader 27, which reads the identification code of the envelope, verifies it is valid and possibly identifies it has been correctly complied and, when recognition is complete, it commands the motor 24 to open the door 20.

When the sensor unit 26 no longer detects the presence of the envelope 13, it provides to activate the motor 24 to close the door 20 while waiting for another envelope 13.

In the embodiment shown here, the sensor unit 26 comprises two rows of sensors one above the other, an upper row 26*a* located in the proximity of the introduction slit 18 and a lower row 26*b* located in the proximity of the door 20.

With this embodiment, the sensor unit 26 is suitable to detect not only the presence of the envelope 13 but also the direction of advance of the envelope 13 with respect to the reception channel 17.

This allows to verify that the envelope 13 actually falls into the sack 19 following the opening of the door 20, and is not withheld by the customer.

The identification code monitored by the reader 27 is memorized by a control unit, possibly with other data such as the date and time the envelope is handed in or suchlike, and then transmitted to the processing laboratories.

All this data can be displayed by the control unit using a suitable enquiry software, so as to be able to answer any possible customer complaint immediately.

The data may be transmitted to the processing laboratories by means of a modem or, as in the embodiment shown here, by a memorization unit 28 solid with the sack 19, which is then used in the processing laboratory to carry out the requested processing.

According to a variant, weighing means 29 are associated with the reception channel 17, for example a load cell, suitable to verify the presence or absence of the photographic material inside the envelope 13.

According to another variant, the reader 27 is of the type suitable to recognize the presence of objects inside the envelope 13 and therefore does not activate the opening of the door 20 if it detects the presence of an empty envelope 13.

In the embodiment wherein the data on the envelope 13 is input by means of a keyboard and computer, a variant of the invention provides that the receipt ticket is issued by the collection device 10 only after the procedure of unloading the envelope 13 into the sack 19 is completed.

In the embodiment shown in FIG. 2, the aforesaid control unit may be that of the automatic distributor 11.

In this case the customer is issued with a defined individual recognition means, such as a magnetic identification card, with a microchip, with a bar code or another type.

With this application, the customer inserts his card into the appropriate slit in the distributor 11 and the envelope 13 into the channel 17 of the collection device 10. The control unit of the distributor 11 memorizes the identification code of the customer's card, and also the code on the envelope 13, thus determining a univocal match.

The envelopes arriving from the processing laboratories and containing the processed photographic material are placed by a worker into the various cells of the automatic distributor 11 so as to determine a univocal correspondence between each cell and the envelope contained therein.

When the customer inserts his personal card into the slit of the distributor 11, the distributor 11 automatically selects the corresponding cell to allow the customer to remove the envelope containing the processed photographic material.

It is obvious that modifications and additions can be made to this invention, but these shall remain within the field and scope thereof.

What is claimed is:

1. Device for the self-service collection of photographic material to be subjected to processing, said photographic material being placed by users in envelopes bearing an identification code and equipped with a corresponding ticket or receipt which can be detached, the envelopes being first compiled by the users with their own identification data and with data regarding the processing required and then introduced into a collection container equipped with an introduction slit, said device comprising a detector located upstream of said collection container for verifying at least the validity of said identification code, said detector governing a door which can be selectively activated and prevents the passage of said envelopes to the collection container in the event that said detector does not give consent for the envelopes to be unloaded, the device being characterized in that it comprises a substantially vertical reception channel to receive the envelopes associated at the upper part with said introduction slit and at the lower part with said collection container, said reception channel being closed at the lower part by said door when said door is in a closed position which prevents the envelope from being introduced into the collection container, said door having an open position which allows the envelope to be introduced into the collection container, said door being functionally associated with said detector, and in that said detector detects the weight of every envelope introduced or the presence of objects inside every envelope, and gives or witholds consent for said door to open.

2. Device as in claim 1, characterized in that said detector detects the weight of every envelope introduced and comprises load cells arranged in cooperation with said door and operating when said door is in the closed position and said envelope rests thereon.

3. Device as in claim 1, characterized in that said detector comprises at least a bar code reader to read and recognize the identification code on the envelopes when said envelopes are resting on said door located in the closed position.

4. Device as in claim 1, characterized in that said detector further comprises sensor unit to detect the direction of advance of the envelope.

5. Device as in claim 4, characterized in that said sensor unit comprises two rows, one above the other, respectively an upper row and a lower row, of sensors, said upper row being located substantially in proximity of the introduction slit and said lower row being located substantially in proximity of the door.

6. Device as in claim 1, characterized in that it comprises a processing unit to memorize the data supplied by said detector.

7. Device as in claim 6, characterized in that the processing unit prints a receipt ticket when the envelope has been unloaded into the collection container.

8. Device as in claim 6, characterized in that said processing unit transfers the data collected into a memorization unit solid with the collection container.

9. Device as in claim 7, characterized in that it is associated with an automatic distributor and shares therewith said processing unit to determine a univocal correspondence between every envelope collected and the corresponding receipt ticket, kept by the user, said univocal correspondence being used to distribute the processed photographic material automatically.

* * * * *